United States Patent
Su et al.

(10) Patent No.: US 11,757,161 B2
(45) Date of Patent: Sep. 12, 2023

(54) BATTERY CELL, BATTERY AND ELECTRICITY CONSUMING DEVICE

(71) Applicant: CONTEMPORARY AMPEREX TECHNOLOGY CO., LIMITED, Ningde (CN)

(72) Inventors: Huasheng Su, Ningde (CN); Chengyou Xing, Ningde (CN); Kun Fang, Ningde (CN); Quankun Li, Ningde (CN); Wenlong Kang, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/930,722

(22) Filed: Sep. 9, 2022

(65) Prior Publication Data

US 2023/0006317 A1    Jan. 5, 2023

Related U.S. Application Data

(63) Continuation of application No. PCT/CN2021/140797, filed on Dec. 23, 2021.

(30) Foreign Application Priority Data

Jan. 25, 2021   (CN) .......................... 202120205310.2

(51) Int. Cl.
   *H01M 50/559*    (2021.01)
(52) U.S. Cl.
   CPC ...... *H01M 50/559* (2021.01); *H01M 2220/20* (2013.01)
(58) Field of Classification Search
   CPC .................................................. H01M 50/559
   See application file for complete search history.

(56) References Cited

U.S. PATENT DOCUMENTS

| 2009/0136840 A1 | 5/2009 | Kim |
| 2010/0092860 A1 | 4/2010 | Seo et al. |
| 2012/0301756 A1* | 11/2012 | Fuhr ................. H01M 50/3425 429/211 |

FOREIGN PATENT DOCUMENTS

| CN | 101645520 A | 2/2010 |
| CN | 108281578 A | 7/2018 |

(Continued)

OTHER PUBLICATIONS

International Search Report and Written Opinion received in International Application PCT/CN2021/140797 dated Mar. 1, 2022.

(Continued)

*Primary Examiner* — Jonathan G Jelsma
(74) *Attorney, Agent, or Firm* — Kilpatrick Townsend & Stockton LLP (57) ABSTRACT

A battery cell is provided. The battery cell includes a tab, an electrode terminal, an adapter for electrical connection between the electrode terminal and the tab. The adapter includes a first connecting portion for electrical connection with the electrode terminal; a second connecting portion for electrical connection with the tab; a third connecting portion for connecting the first connecting portion and the second connecting portion; and a bending portion, the third connecting portion is connected with the first connecting portion by the bending portion and the third connecting portion is connected with the second connecting portion by the bending portion; the third connecting portion includes a reinforcing portion, and the reinforcing portion is located at the connection of the third connecting portion and the bending portion; the minimum distance L from an edge of the reinforcing portion to a center line of the bending portion satisfies: $R<L<(R+2)$.

11 Claims, 11 Drawing Sheets

C-C (56) References Cited

FOREIGN PATENT DOCUMENTS

| | | | | |
|---|---|---|---|---|
| CN | 207818806 U | | 9/2018 | |
| CN | 208014793 U | | 10/2018 | |
| CN | 109360932 A | * | 2/2019 | ........ H01M 10/0525 |
| CN | 112242593 A | | 1/2021 | |
| CN | 214336804 U | | 10/2021 | |
| JP | H08124547 A | | 5/1996 | |
| JP | 2001135299 A | | 5/2001 | |
| JP | 2008218132 A | | 9/2008 | |
| JP | 2017168183 A | | 9/2017 | |
| KR | 20060051749 A | | 5/2006 | |
| KR | 20080010148 A | | 1/2008 | |
| KR | 100833745 B1 | | 5/2008 | |

OTHER PUBLICATIONS

The first Office Action received in the corresponding Japanese Application 2022-552287, dated Jan. 30, 2023.
The first Office Action received in the corresponding Korean Application 10-2022-7029902, dated Jan. 19, 2023.
Decision to Grant a Patent received in the corresponding Japanese Application 2022-552287, dated May 16, 2023.
Notice of Allowance received in the corresponding Korean Application 10-2022-7029902, dated May 1, 2023.

* cited by examiner

BATTERY CELL, BATTERY AND ELECTRICITY CONSUMING DEVICE

CROSS-REFERENCE OF RELATED APPLICATIONS

The present application is a continuation of International Application PCT/CN2021/140797, filed Dec. 23, 2021, which claims the priority of the Chinese patent application 202120205310.2 entitled "Battery Cell, Battery and Electricity Consuming Device" and filed on Jan. 25, 2021, which are incorporated herein in their entireties by reference.

TECHNICAL FIELD

The present disclosure relates to the technical field of battery, in particular, to a battery cell, a battery and an electricity consuming device.

BACKGROUND

Since the rechargeable battery has the advantages of high energy density, high power density, many cycles of use and long storage time, it has been widely used in electric vehicles, mobile devices or power tools.

In current battery, the adapter is generally used to connect the tab and the electrode terminal of the battery. In battery, it is usually necessary to bend the adapter. In order to facilitate the bending, the adapter cannot be made too thick. It is usually a soft sheet structure. Due to the low overall hardness of the adapter, when bending, the adapter bends easily in non-predetermined areas, resulting in the offset of the crease, and the adapter that is not bent as predetermined will easily prevent the electrode assembly from being installed into the shell of the battery. If it is forcibly installed into the shell of the battery, it will cause the adapter to be overstressed locally, which will reduce the life of the adapter, and thereby affect the service life of the battery.

SUMMARY

The present disclosure provides a battery cell, a battery and an electricity consuming device, which can bend the adapter between the electrode terminal and the tab along a predetermined position.

In a first aspect, the present disclosure provides a battery cell including a tab; an electrode terminal; and an adapter for electrical connection between the electrode terminal and the tab; the adapter includes a first connecting portion for electrical connection with the electrode terminal; a second connecting portion for electrical connection with the tab; a third connecting portion for connecting the first connecting portion and the second connecting portion; a bending portion, the third connecting portion is connected with the second connecting portion by the bending portion and the third connecting portion is connected with the second connecting portion by the bending portion; wherein, the third connecting portion includes a reinforcing portion, and the reinforcing portion is located at the side of the third connecting portion connected with the bending portion; The minimum distance L between an edge of the reinforcing portion and a center line of the bending portion satisfies: R<L<(R+2 mm), where L is the minimum distance between the edge of the reinforcing portion and the center line of the bending portion, and R is a bend radius of the bending portion.

In some embodiments, the reinforcing portion extends from a bending portion of the third connecting portion close to the first connecting portion to a bending portion of the third connecting portion close to the second connecting portion.

In some embodiments, the number of reinforcing portions is at least two, which are respectively located on a side of the third connecting portion close to the first connecting portion and a side of the third connecting portion close to the second connecting portion.

In some embodiments, the reinforcing portion includes a protruding structure, disposed on at least one side surface of the third connecting portion along a thickness direction of the third connecting portion.

In some embodiments, the protruding structure includes a plurality of protruding portions, and the protruding portions are arranged in a direction parallel to the centerline of the third connecting portion.

In some embodiments, the thickness of the protruding structure is less than or equal to the bending radius of the bending portion.

In some embodiments, the reinforcing portion includes an insulating layer covering at least a part of at least one side surface of the third connecting portion in a thickness direction of the third connecting portion.

In some embodiments, the insulating layer covers two side surfaces of the third connecting portion along the thickness direction.

In some embodiments, the thickness of the insulating layer is less than or equal to the bending radius of the bending portion.

In a second aspect, the present disclosure proposes a battery including: the battery cell of the first aspect.

In a third aspect, the present disclosure proposes an electricity consuming device including the battery cell of the first aspect, and the battery cell is configured to provide electrical energy.

In the present disclosure, a reinforcing portion is provided on the connecting piece of the battery cell, and the position of the bending axis of the bending portion is limited by the reinforcing portion. Under the premise of not obviously increasing the size of the connecting piece after bending, it is guaranteed that the bending portion can be bent according to the expected position, so as to avoid the offset of the bending position of the bending portion from the expected position, thereby reducing the possibility of wear or damage of the adapter in contact with the shell due to the offset of the bending position, thereby increasing the service life of the adapter.

The above description is only an overview of the technical solutions of the embodiments of the present disclosure. In order to be able to understand the technical means of the embodiments of the present disclosure more clearly so as to implement according to the content of the description, and in order to allow the above-mentioned and other purposes, features and advantages of the embodiments of the present disclosure can be more obvious and easy to understand, the specific embodiments of the present disclosure are given below.

BRIEF DESCRIPTION OF THE DRAWINGS

Other features, objects and advantages of the present disclosure will become more apparent by reading the following detailed description of non-limiting embodiments with reference to the accompanying drawings, wherein the same or similar reference numerals denote the same or similar feature.

In the accompanying drawings, the drawings are not necessarily drawn to actual scale.

DESCRIPTION OF SIGN 1, vehicle;
10, battery; 11, first portion; 12, second portion;
20, battery cell; 21, tab; 22, shell; 23, electrode terminal; 24, adapter; 241, first connecting portion; 242, second connecting portion; 243, third connecting portion 244, bending portion; 245, reinforcing portion; 25, electrode assembly; 26, end cap;
30, controller;
40, motor.

DETAILED DESCRIPTION

Features and exemplary embodiments of various aspects of the present disclosure will be described in detail below. In the following detailed description, numerous specific details are set forth in order to provide a thorough understanding of the present disclosure. However, it will be apparent to those skilled in the art that the present disclosure may be practiced without some of these details. The following description of the embodiments is merely to provide a better understanding of the present disclosure by illustrating examples of the present disclosure. The present disclosure is in no way limited to any specific configurations and algorithms set forth below, but covers any modifications, substitutions and improvements of elements, components and algorithms without departing from the spirit of the present disclosure. In the drawings and the following description, well-known structures and techniques have not been shown in order to avoid unnecessarily obscuring the present disclosure.

Unless otherwise defined, all technical and scientific terms used herein have the same meaning as commonly understood by those skilled in the technical field of the present disclosure; the terms used in the description of the present disclosure are only for describing the specific examples, and are not intended to limit the present disclosure; the terms "comprise" and "have" and any variations thereof in the description and claims and the above description of the drawings in the present disclosure are intended to cover non-exclusive inclusions. The terms "first", "second" and the like in the description and claims or the above drawings of the present disclosure are used to distinguish different objects, rather than to describe a specific order or primary and secondary relationship.

In the present disclosure, reference to an "embodiment" means that a particular feature, structure, or characteristic described in connection with the embodiment can be included in at least one embodiment of the present disclosure. The appearances of the phrase in various places in the specification are not necessarily all referring to the same embodiment, nor a separate or alternative embodiment that is mutually exclusive with other embodiments. It is explicitly and implicitly understood by those skilled in the art that the embodiments described in the present disclosure may be combined with other embodiments.

In the description of the present disclosure, it should be noted that, unless otherwise expressly specified and limited, the terms "install", "connected with", "connect" and "attach" should be understood in a broad sense. For example, it can be a fixed connection, and can also be a detachable connection [SF1], or an integral connection; it can be a direct connection, an indirect connection through an intermediate medium, or an internal communication between two components. For those of ordinary skill in the art, the specific meanings of the above terms in the present disclosure can be understood according to specific situations.

Term "and/or" in the present disclosure is only a kind of association relationship that describes associated objects, and indicates that there can be three kinds of relationships, for example, A and/or B, which can indicate three cases: A alone exists, A and B exist simultaneously, and B alone exists. In addition, the character "/" in the present disclosure generally indicates that the related objects are in an "or" relationship.

"Multiple" that appears in the present disclosure refers to two or more (including two). In the same way, "multiple groups" refers to more than two groups (including two groups), and "multiple sheets" refers to two or more pieces (including two pieces).

In the present disclosure, the battery cell can include lithium ion secondary battery, lithium ion primary battery, lithium sulfur battery, sodium lithium ion battery, sodium ion battery or magnesium ion battery, etc., which are not limited in the embodiments of the present disclosure. The battery cell may be in the form of a cylinder, a flat body, a rectangular parallelepiped or other shapes, which are not limited in the embodiments of the present disclosure. The battery cell is generally divided into three types according to the packaging method: cylindrical battery cell, square-shaped battery cell, and soft-pack battery cell, which are not limited in the embodiments of the present disclosure.

The battery mentioned in various embodiments refers to a single physical module including one or more battery cells to provide higher voltage and capacity. For example, the battery mentioned in accordance with the present disclosure may include battery module or battery pack and the like. The battery typically includes a casing for packing one or more battery cells. The casing can prevent liquids or other foreign objects from affecting the charging or discharging of the battery cell.

The battery cell includes an electrode assembly and an electrolyte, and the electrode assembly is made up of a positive electrode sheet, a negative electrode sheet and a separator. The battery cell mainly relies on the movement of metal ions between the positive and negative sheets to work. The positive electrode sheet includes a positive electrode current collector and a positive electrode active material layer, the positive electrode active material layer is coated on the surface of the positive electrode current collector, the current collector that is not coated with the positive electrode active material layer protrudes from the current collector coated with the positive electrode active material layer, and the current collector that is not coated with the positive electrode active material layer serves as the positive electrode tab. Taking a lithium-ion battery as an example, the material of the positive electrode current collector can be aluminum, and the positive electrode active material can be lithium cobaltate, lithium iron phosphate, ternary lithium or lithium manganate and so on. The negative electrode sheet includes a negative electrode current collector and a negative electrode active material layer, the negative electrode active material layer is coated on the surface of the negative electrode current collector, the current collector that is not coated with the negative electrode active material layer protrudes from the current collector coated with the negative electrode active material layer, the current collector that is not coated with the negative electrode active material layer was used as the negative electrode tab. The material of the negative electrode current collector can be copper, and the negative electrode active material can be carbon or silicon and so on. In order to ensure that a large current is passed without fusing, the positive electrode tabs are multiple in the number and are stacked together, and the negative tabs are multiple in the number and are stacked together. The material of the separator can be PP or PE, etc. In addition, the electrode assembly may be a wound structure or a laminated structure, which are not limited in the embodiments of the present disclosure. The development of battery technology needs to consider many design factors at the same time, such as energy density, cycle life, discharge capacity, charge-discharge rate and other performance parameters. In addition, the safety of the battery also needs to be considered.

The technical solutions described in the embodiments of the present disclosure are all applicable to various devices using batteries, such as mobile phones, portable devices, notebook computers, battery cars, electric toys, electric tools, electric vehicles, ships and spacecraft, etc. For example, the spacecraft include airplane, rocket, space shuttle, and spaceship.

It should be understood that the technical solutions described in various embodiments are not only limited to the equipment described above, but also applicable to all equipment using batteries, but for the sake of brevity, the following embodiments are described by taking an electric vehicle as an example.

Figure 1:
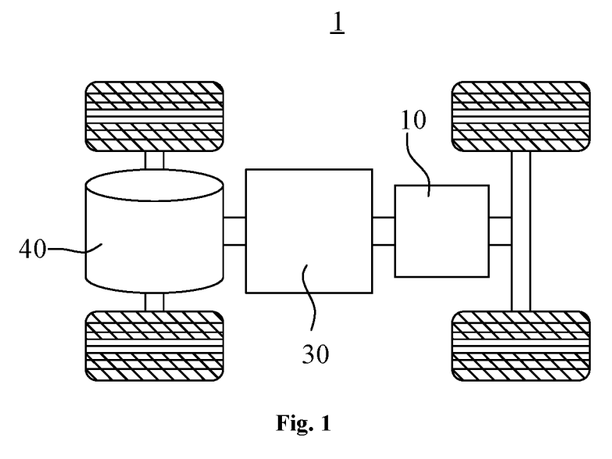
FIG. 1 is the structural schematic diagram of a vehicle according to an embodiment of the present disclosure.

For example, as shown in FIG. 1 which is a structural schematic diagram of a vehicle 1 according to an embodiment in accordance with the present disclosure, the vehicle 1 can be a fuel vehicle, a gas vehicle or a new energy vehicle, and the new energy vehicle can be a pure electric vehicle, a hybrid power vehicle or an extended-range vehicle, etc. A motor 40, a controller 30 and a battery 10 may be provided inside the vehicle 1, and the controller 30 is used to control the battery 10 to supply power to the motor 40. For example, the battery 10 may be provided at the bottom of the vehicle 1 or at the front or rear of the vehicle. The battery 10 can be used for power supply of the vehicle 1. For example, the battery 10 can be used as the operating power source of the vehicle 1 for the circuit system of the vehicle 1, for example, for the operation power requirements at the time of the starting, navigation and operation of the vehicle 1. In another embodiment of the present disclosure, the battery 10 can not only be used as the operating power source of the vehicle 1, but also can be used as the driving power source of the vehicle 1 to provide driving power for the vehicle 1 in place of or partially in place of fuel or natural gas.

In order to meet different usage power requirements, the battery 10 may include a plurality of battery cells, wherein the plurality of battery cells may be connected in series or in parallel or in series-parallel, and the series-parallel refers to a mixture of series connection and parallel connection. A battery can also be called a battery pack. Optionally, a plurality of battery cells can be connected in series or in parallel or series-parallel to form a battery module, and then a plurality of battery modules can be connected in series or in parallel or series-parallel to form the battery 10. That is to say, a plurality of battery cells can directly form the battery 10, or can form a battery module first, and then form a battery from the battery module.

Figure 2:
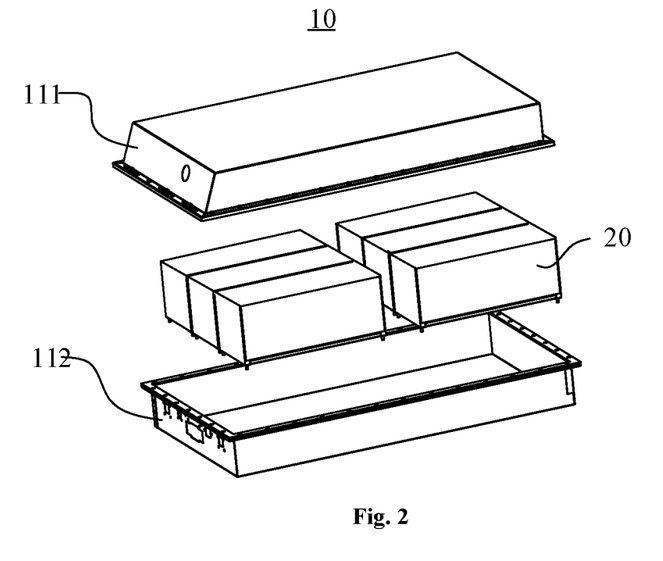
FIG. 2 is the structural schematic diagram of a battery according to an embodiment of the present disclosure.

For example, as shown in FIG. 2 which is a structural schematic diagram of a battery 10 according to an embodiment of the present disclosure, the battery 10 may include a plurality of battery cells 20. The battery 10 may further include a casing (or a cover body), the inside of the casing is a hollow structure, and the plurality of battery cells 10 are accommodated in the casing. As shown in FIG. 2, the casing may include two parts which are referred to as the first portion 111 and the second portion 112 respectively, and the first portion 111 and the second portion 112 are fastened together. The shapes of the first portion 111 and the second portion 112 may be determined according to the combined shape of the plurality of battery cells 20, and each of the first portion 111 and the second portion 112 may have an opening. For example, both the first portion 111 and the second portion 112 can be a hollow cuboid and each has only one surface that is an open surface, the opening of the first portion 111 and the opening of the second portion 112 are arranged opposite to each other, and the first portion 111 and the second portion 112 are fastened with each other to form a casing with a closed chamber. A plurality of battery cells 20 are placed in the casing formed after the first portion 111 and the second portion 112 are fastened together, after the plurality of battery cells 20 are combined in parallel connection or in series connection or in series-parallel connection.

Figure 3:
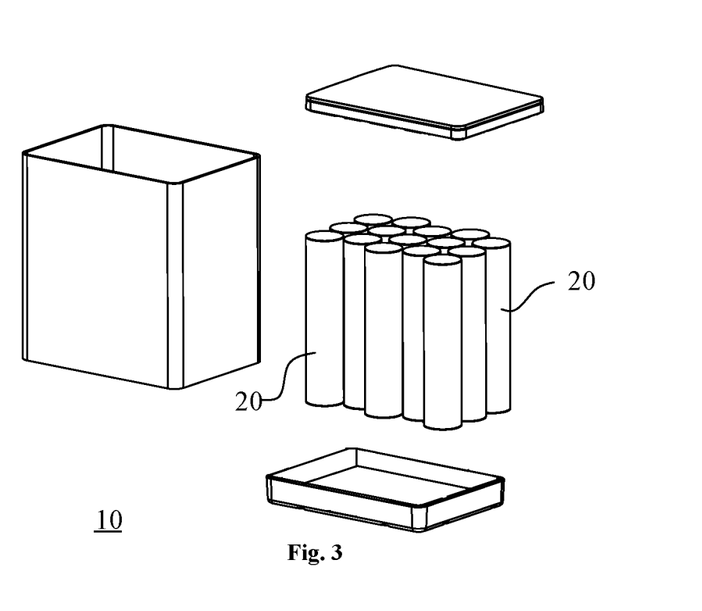
FIG. 3 is a schematic diagram of an example of a battery module.

In some embodiments, the battery 10 may also include other structures, which will not be repeated here. For example, the battery 10 may further include a bus component for realizing electrical connection between the plurality of battery cells 20, such as parallel connection or series connection or series-parallel connection. Specifically, the bus component may realize electrical connection between the battery cells 20 by connecting the electrode terminals of the battery cells 20. Further, the bus component may be fixed to the electrode terminals of the battery cells 20 by welding. The electrical energy of the plurality of battery cells 20 can be further drawn out through the casing through the conductive mechanism. Optionally, the conductive mechanism may also belong to the bus component. According to different power requirements, the number of battery cells 20 can be set to any value. A plurality of battery cells 20 can be connected in series, in parallel or in series-parallel to achieve larger capacity or power. Since the number of battery cells 20 included in each battery 10 may be large, in order to facilitate installation, the battery cells 20 may be arranged in groups, and each group of battery cells 20 constitutes a battery module. The number of battery cells 20 included in the battery module is not limited, and can be set according to requirements. For example, FIG. 3 is an example of a battery module. The battery may include a plurality of battery modules, and the battery modules may be connected in series, parallel, or in series-parallel.

Figure 4:
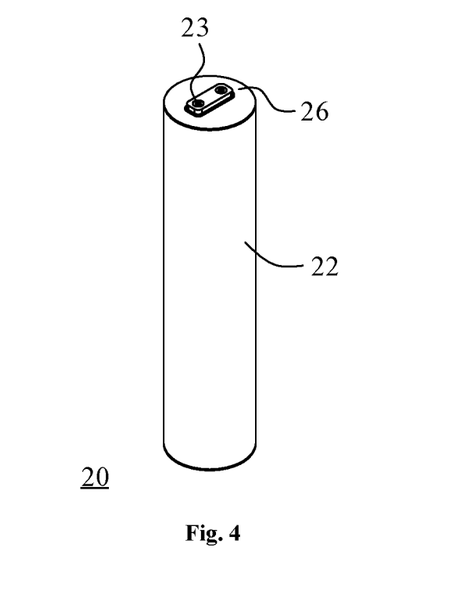
FIG. 4 is a schematic diagram of a battery cell according to an embodiment of the present disclosure.
Figure 5:
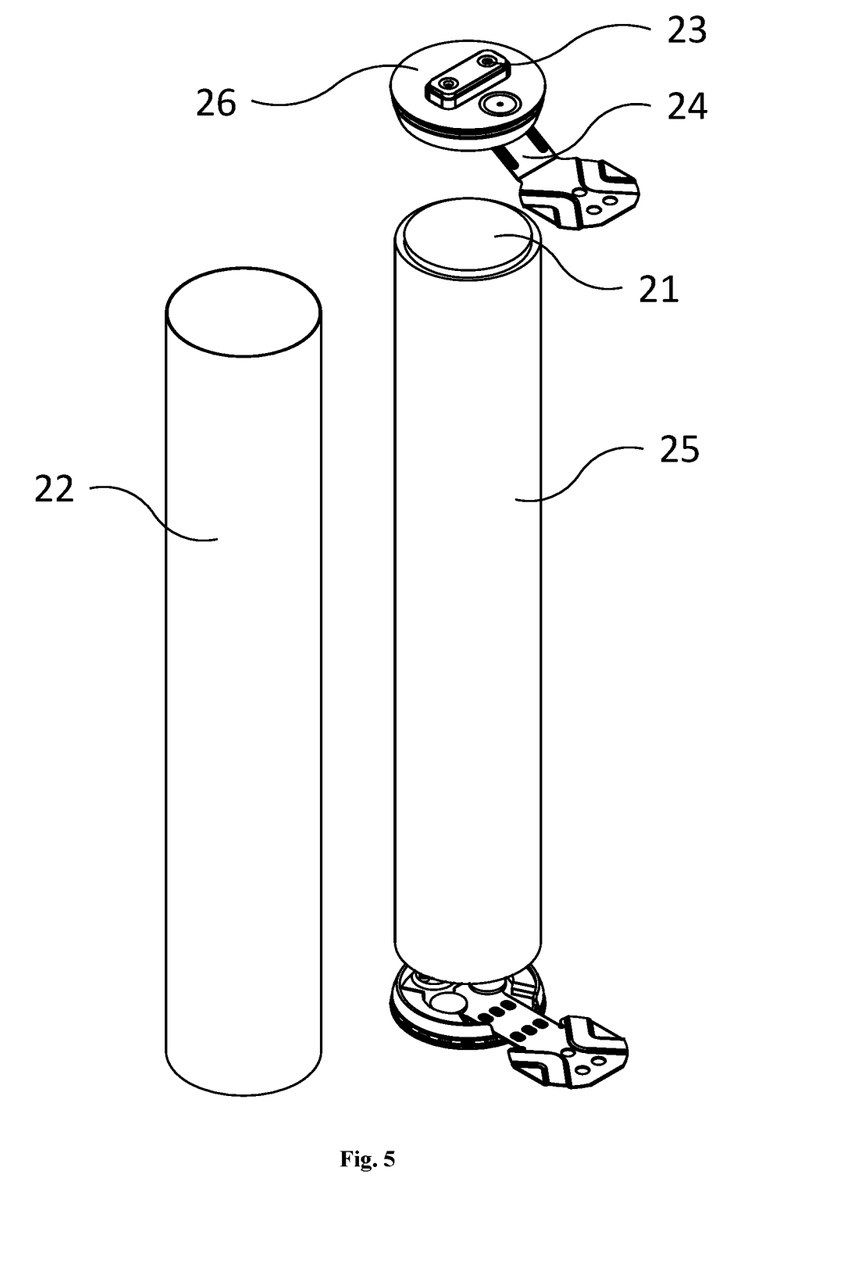
FIG. 5 is an exploded view of the battery cell corresponding to FIG. 4.
Figure 6:
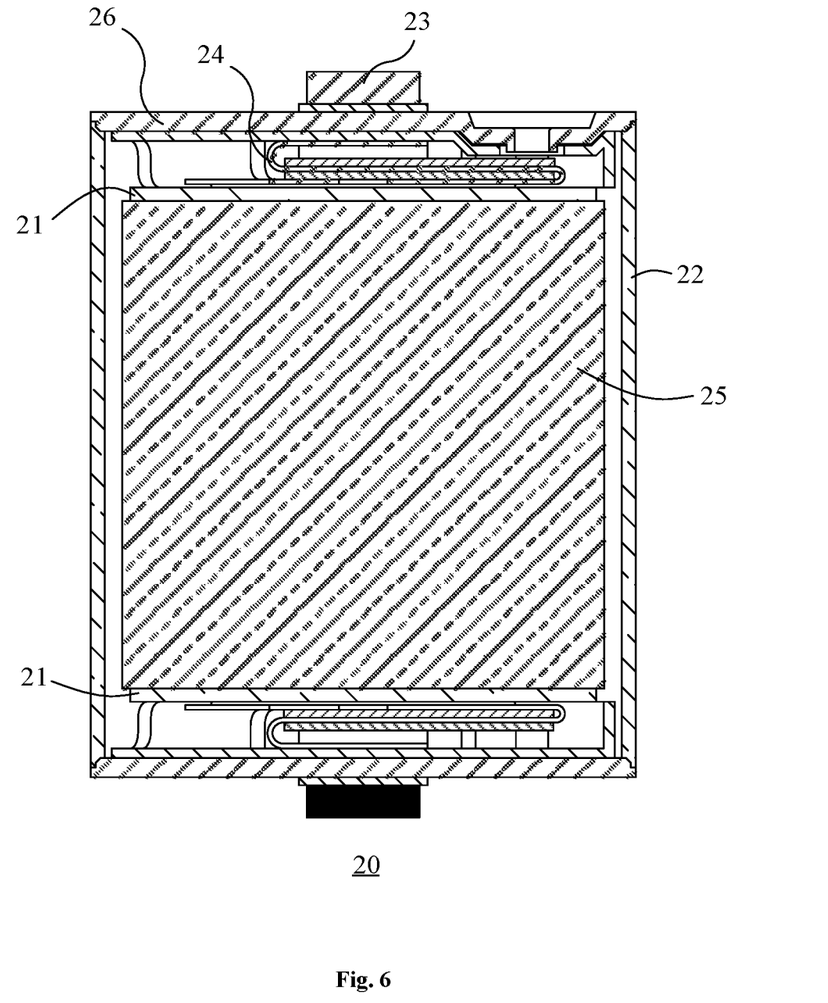
FIG. 6 is a longitudinal sectional view of the battery cell corresponding to FIG. 4.

FIG. 4 is a schematic diagram of a battery cell 20 according to an embodiment of the present disclosure; FIG. 5 is an exploded view of the battery cell 20 corresponding to FIG. 4; FIG. 6 is a sectional view of the battery cell 20 corresponding to FIG. 4.

As shown in FIG. 4 to FIG. 6, the battery cell 20 includes: an electrode assembly 25, a shell 22 and an end cap assembly. The shell 22 is a hollow column structure, for example, a cylindrical structure. It can be understood that the shell 22 may also have other structures, such as a prismatic shape, etc. In the present disclosure, a cylindrical shape is used as an example for description. When the shell 22 can be a hollow cylinder, the end face of the shell 22 is an open face, that is, the end face does not have a wall so that the shell 22 communicates with the inside and the outside.

The end cap assembly includes an end cap 26 that covers the opening of the shell 22 and is connected to the shell 22 to form a closed cavity in which the electrode assembly 25 is placed. The shell 22 is filled with an electrolyte, such as an electrolytic solution. The end cap 26 is generally flat.

In some embodiments, both ends of the shell 22 have openings. Correspondingly, two end cap assemblies are provided, and the end caps 26 of the two end cap assemblies are respectively used to close the corresponding openings.

The end cap assembly further includes an electrode terminal 23, and the electrode terminal 23 is provided on the end cap 26. The end cap 26 has a through electrode lead-out hole, and the electrode terminal 23 can pass through the electrode lead-out hole and protrude to the outside of the end cap 26. The number of electrode terminals 23 of each end cap assembly is one or more. In some examples, the electrode terminals 23 of each end cap assembly are multiple. In some embodiments, the end cap assembly further includes a sealing member and an insulating member. The sealing member is disposed between the terminal plate and the end cap 26 and is used to seal the electrode lead-out holes. The insulating member is provided on the inner side of the end cap 26 and serves to separate the cap plate 25 from the electrode assembly 25.

The electrode assembly 25 has two tabs 21, and the polarities of the two tabs 21 are opposite. In some examples, the two tabs 21 are located at two ends of the electrode assembly 25 respectively, and are respectively electrically connected to the electrode terminals 23 of one end cap assembly. The electrode terminal 23 to which the positive electrode tab is electrically connected is a positive terminal and the electrode terminal 23 to which the negative electrode tab is electrically connected is a negative terminal.

The end cap assembly further includes an adapter 24, and the adapter 24 is used for the electrical connection between the electrode terminal 23 and the tab 21. The adapter 24 is located between the tab 21 and the end cap 26.

Figure 7:
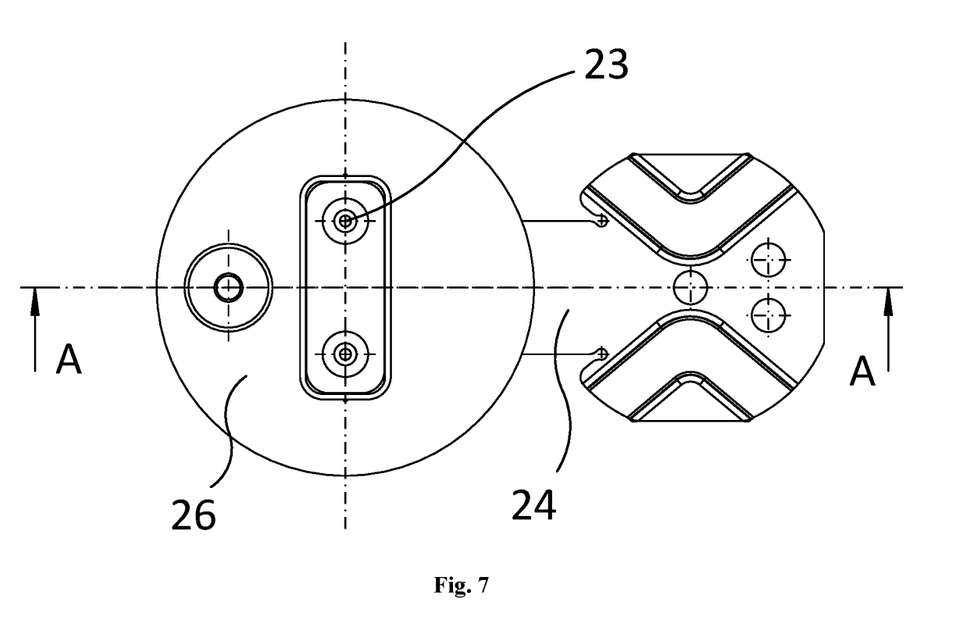
FIG. 7 is a schematic diagram of the connecting state of the electrode terminal and the adapter before the adapter according to an embodiment of the present disclosure is bent.
Figure 8:
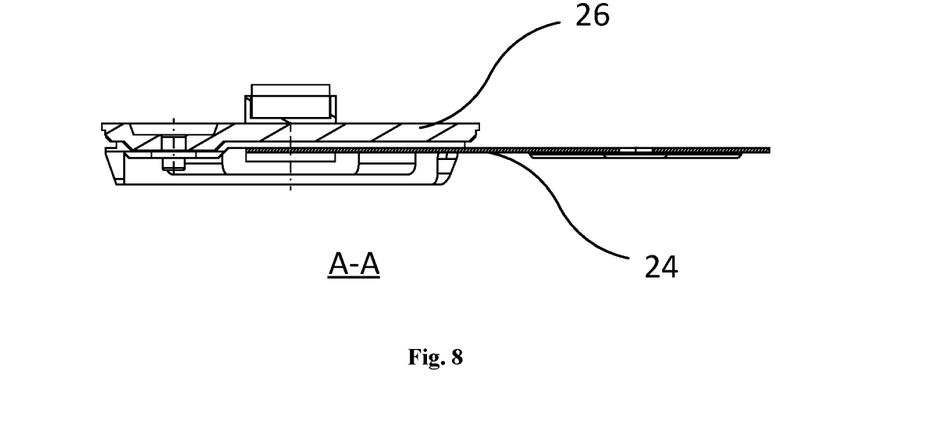
FIG. 8 is a sectional view taken along A-A section line of the electrode terminal and the adapter of FIG. 7.
Figure 9:
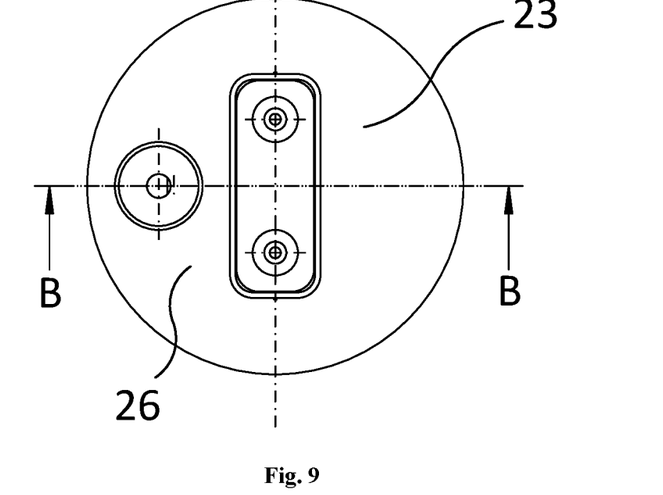
FIG. 9 is a schematic diagram of the connecting state of the electrode terminal and the adapter after the adapter according to an embodiment of the present disclosure is bent.
Figure 10:
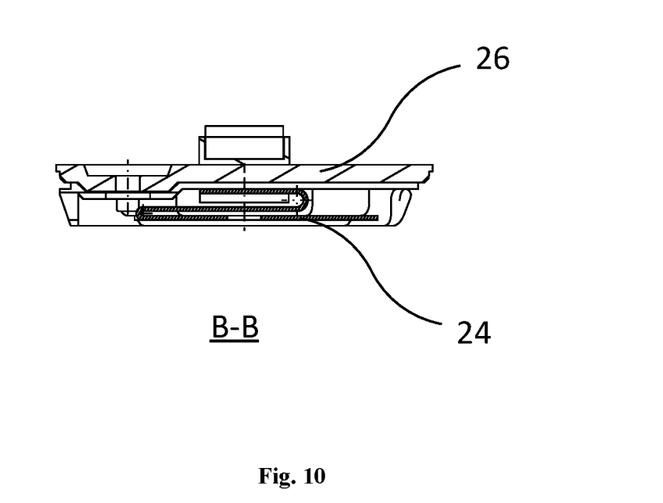
FIG. 10 is a sectional view taken along B-B section line of the electrode terminal and the adapter of FIG. 9.
Figure 11:
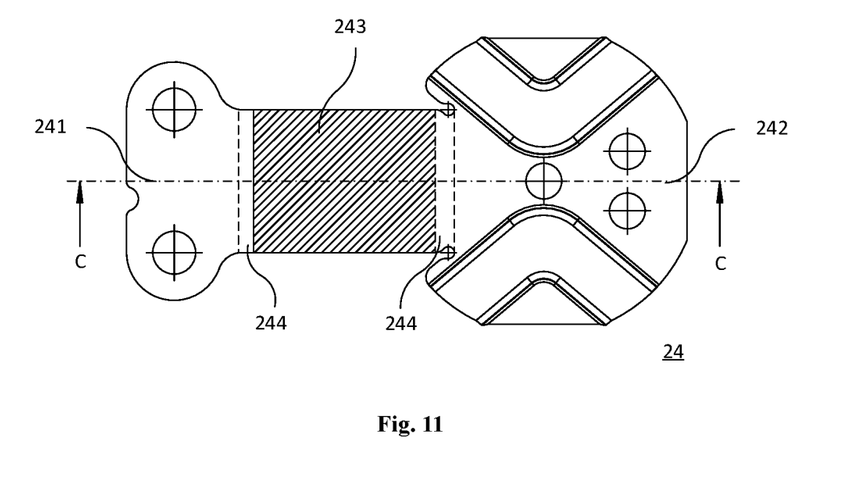
FIG. 11 is a top view of the adapter according to an embodiment of the present disclosure in an unbent state.

FIG. 7 is a schematic diagram of the connecting state of the electrode terminal and the adapter 24 before the adapter 24 of an embodiment of the present disclosure is bent; FIG. 8 is a sectional view taken along A-A section line of the electrode terminal 23 and the adapter 24 of FIG. 7; FIG. 9 is a schematic diagram of the connecting state of the electrode terminal 23 and the adapter 24 after the adapter 24 according to an embodiment of the present disclosure is bent; FIG. 10 is a sectional view taken along B-B section line of the electrode terminal 23 and the adapter 24 of FIG. 9; FIG. 11 is a top view of the adapter 24 in an unbent state according to an embodiment of the present disclosure.

As shown in FIG. 7 to FIG. 11, the adapter 24 includes a first connecting portion 241, a second connecting portion 242, a third connecting portion 243 and a bending portion 244. The first connecting portion 241 is used for electrical connection with the electrode terminal; the second connecting portion 242 is used for electrical connection with the tab 21; the third connecting portion 243 is used for connecting the first connecting portion 241 and the second connecting portion 242; the third connecting portion 243 is connected with the first connecting portion 241 by the bending portion 244 and the third connecting portion 243 s connected with the second connecting portion 242 by the bending portion 244.

Figure 12:
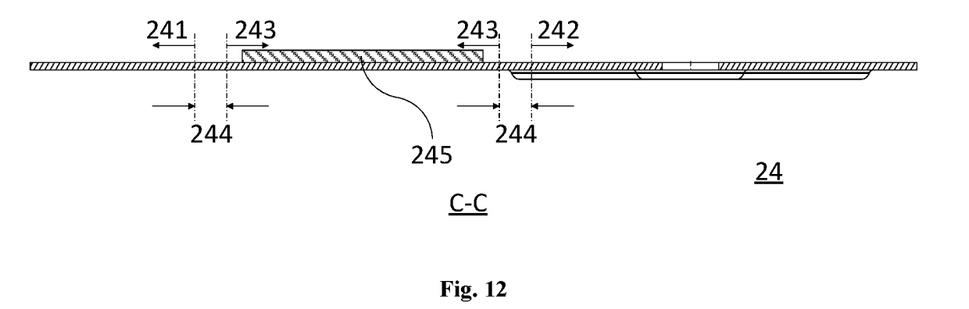
FIG. 12 is a sectional view taken along C-C section line of the adapter of FIG. 11.
Figure 13:
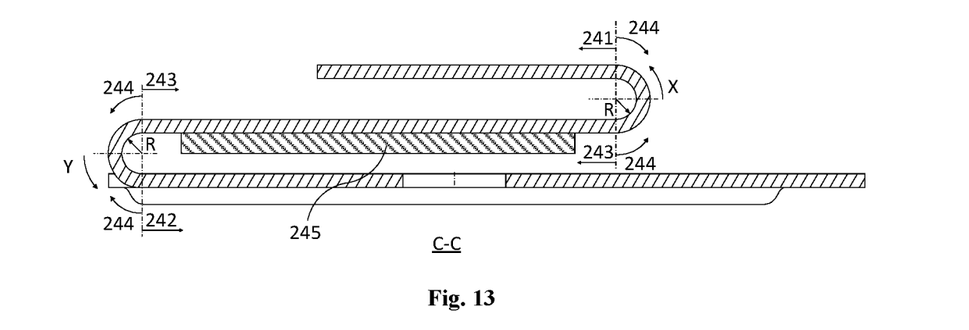
FIG. 13 is a sectional view taken along C-C section line after the adapter of FIG. 11 is bent.

FIG. 12 is a sectional view taken along C-C section line when the adapter 24 of FIG. 11 is in an unbent shape; FIG. 13 is a sectional view taken along the C-C section line after the adapter 24 of FIG. 11 is bent. As shown in FIGS. 12 and 13, when the tabs 21 and the electrode terminals 23 are installed, the bending portion 244 between the first connecting portion 241 and the third connecting portion 243 is bent along the first direction X, and the bending portion 244 between the second connecting portion 242 and the third connecting portion 243 is bent along the second direction Y, wherein the first direction is opposite to the second direction, so that the first connecting portion 241, the third connecting portion 243 and the second connecting portion 242 form three-layer layered structure.

Before bending, the adapter 24 is generally plate-shaped and has a relatively large length. At this time, the adapter 24 can be conveniently connected to the tab 21; after the adapter 24 is connected to the tab 21, the adapter 24 is bent. By bending the adapter 24, the space occupied by the adapter 24 can be reduced, and the connection between the end cap 26 and the shell 22 is facilitated.

It should be noted that, the first connecting portion 241, the second connecting portion 242, the third connecting portion 243 and the bending portion 244 are integral sheet structures, all of which are part of the adapter 24. When the bending portion 244 is not bent, the bending portion 244 and the third connecting portion 243 are located on the same plane, and the center line of the bending portion 244 in this plane is the position of the crease after the bending portion is bent; After the bending portion 244 is bent, the bending portion 244 forms a bending axis, and the whole bending portion 244 is rotated and bent around the bending axis to form a curved surface. At this time, the bending axis is parallel to the center line of the bending portion 244 and both determine a virtual plane. The virtual plane is parallel to the plane where the third connecting portion is located. In addition, the position of the center line of the bending portion 244 is the position of the bending crease.

Since the adapter 24 is in the shape of a sheet as a whole, it is usually made of a soft material to facilitate bending. When bending the adaptor 24, the applicant noticed that when the adaptor 24 is bent, due to the use of soft materials, the bending position of the adaptor 24 offsets and/or deflects easily relative to the preset bending position, resulting in that the adapter 24 cannot be bent at the expected bending position, that is, the bending position is prone to offset, resulting in that during the production process, the end cap does not enter the shell easily or is forced into the shell and the adapter 24 is subjected to severe stress locally, resulting in a serious reduction in the service life of the adapter 24.

Based on the above problems, the applicant has improved the structure of the battery cell, which will be described in detail below in conjunction with specific embodiments.

Figure 14:
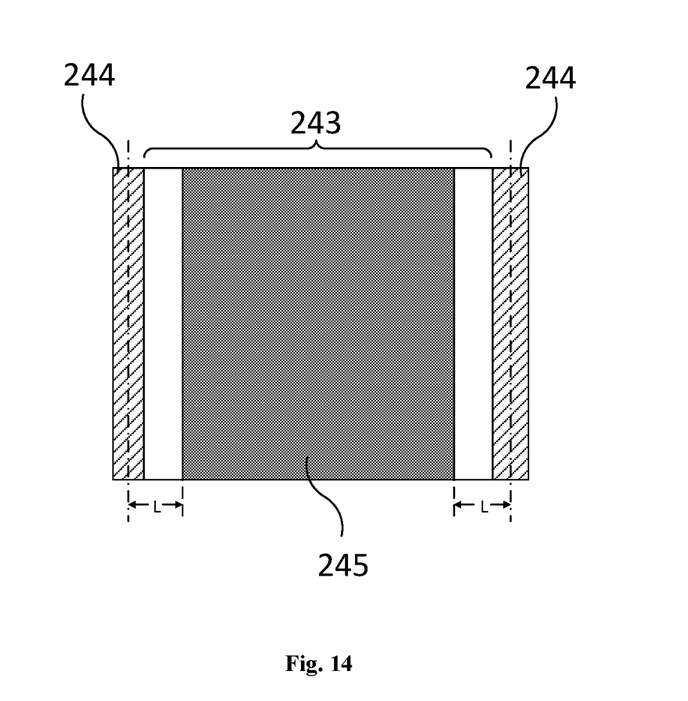
FIG. 14 is a partial enlarged view of the third connecting portion and the bending portion of FIG. 11 in an embodiment of the present disclosure.

FIG. 14 is a partial enlarged view of the third connecting portion 243 and the bending portion 244 corresponding to FIG. 11 in an embodiment of the present disclosure. As shown in FIGS. 11 to 14, the third connecting portion 243 includes a reinforcing portion 245, two opposite sides of the third connecting portion 243 are connected to the two bending portions 244, and the reinforcing portion 245 is located between the two sides. Since the reinforcing portion 245 bends more difficultly than the bending portion 244, when the bending portion 244 is bent, the edge of the reinforcing portion 245 can be bent so that the crease of the bending portion 244 is coincided with the preset crease so as to attain that the reinforcing portion 245 can position the bending portion 244. The minimum distance L between the edge of the reinforcing portion 245 and the centerline of the bending portion 244 satisfies: $R<L<(R+2\ \text{mm})$, where L is the minimum distance between the edge of the reinforcing portion 245 and the centerline of the bending portion 244, R, is the bending radius of the bending portion 244. Since $R<L<(R+2\ \text{mm})$, the reinforcing portion 245 will not be too far or too close to the bending portion 244. Once the reinforcing portion 245 is too far away from the bending portion 244, the position-limiting effect of the reinforcing portion 245 on the bending portion 244 will be weakened, resulting in an inaccurate bending position. Once the reinforcing portion 245 is too close to the bending portion 244, the reinforcing portion 245 will affect the bending of the bending portion 244, resulting in difficulty in bending. It should be noted that, as shown in FIG. 13, when the bending portion 244 is in a bent state, the bending radius R is the inner diameter of the bending of the bending portion 244.

By limiting the position of the bending axis after the bending portion 244 is bent through the reinforcing portion 245, the bending crease of the bending portion 244 can be prevented from being offset, reducing the possibility of wear and damage of the adapter in contact with the casing 22 due to the offset of the crease and increasing the service life of the adapter 24.

As shown in FIG. 14, the reinforcing portion 245 extends from a side of the third connecting portion 243 close to the first connecting portion 241 to a side of the third connecting portion 243 close to the second connecting portion 242. Since the reinforcing portion 245 extends on the third connecting portion 243, when the adaptor 24 is bent, the adaptor 24 is directly bent along the reinforcing portion 245, and the position of the corresponding crease of the bending portion 244 can satisfy the requirements of the preset crease position. Exemplarily, the reinforcing portion 245 may cover two side surfaces of the third connecting portion 243 along the thickness direction; or, the reinforcing portion 245 may only cover one side surface of the third connecting portion 243 along the thickness direction.

Figure 15:
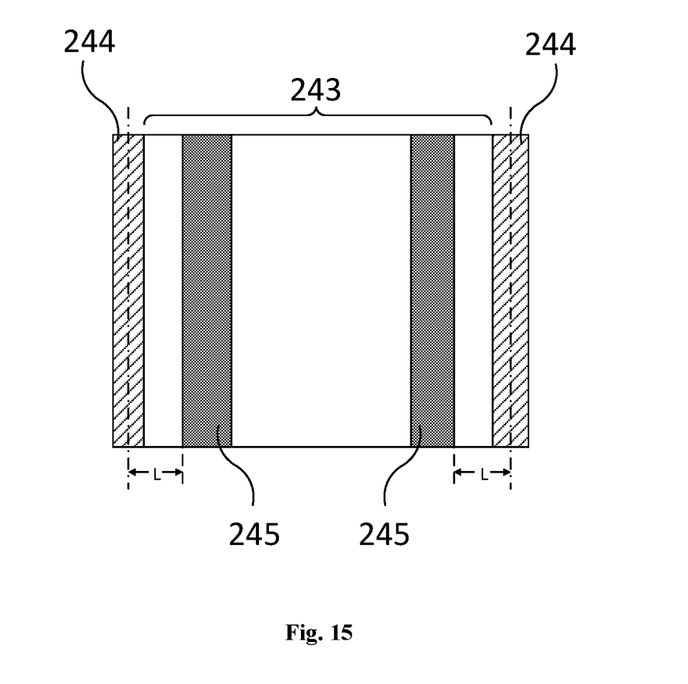
FIG. 15 is a partial enlarged view of the third connecting portion and the bending portion of FIG. 11 in another embodiment of the present disclosure.

FIG. 15 is a partial enlarged view of the third connecting portion 243 and the bending portion 244 of FIG. 11 in another embodiment of the present disclosure. As shown in FIG. 15, the number of the reinforcing portions 245 is at least two, which are respectively located on a side of the third connecting portion 243 close to the first connecting portion 241 and a side of the third connecting portion 243 close to the second connecting portion 242. Since the reinforcing portion 245 is located at the side where the third connecting portion 243 is connected with the bending portion 244, when the adapter 24 is bent, the adapter 24 is directly bent along the reinforcing portion 245, and the position of the corresponding crease of the bending portion 244 can satisfy the requirements of the preset crease position. Exemplarily, the reinforcing portion 245 are two long strips structures extending along the side where the third connecting portion 243 is connected with the bending portion 244; or, the reinforcing portions 245 are two groups, and each group of reinforcing portions 245 is arranged along the side where the third connecting portion 243 is connected with the bending portion 244.

Figure 16:
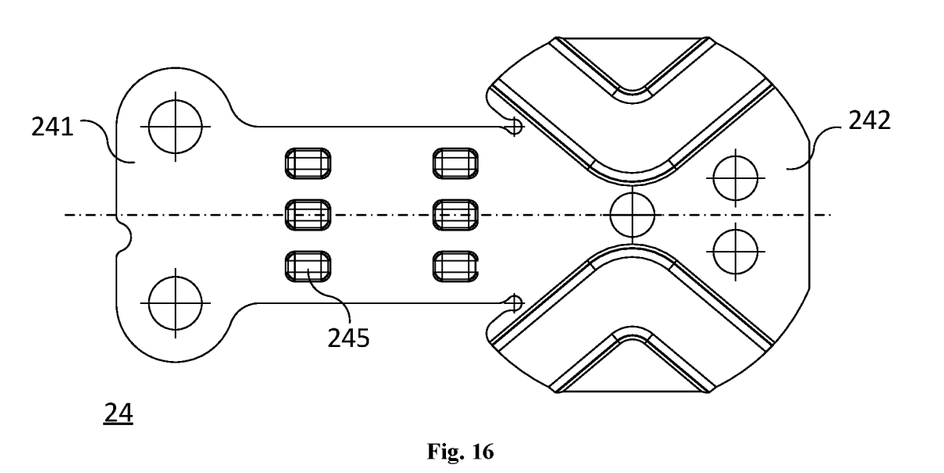
FIG. 16 is a top view when the adapter of an embodiment of the present disclosure is a protruding structure.
Figure 17:
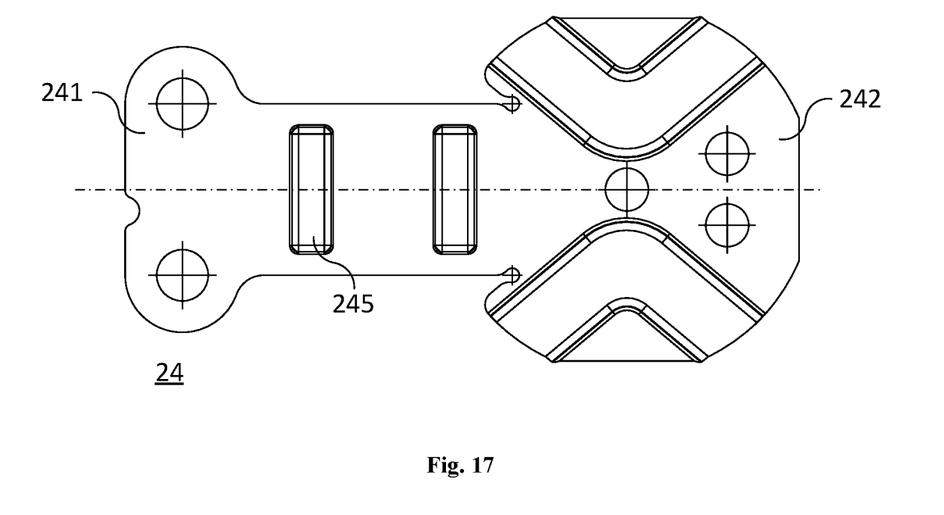
FIG. 17 is a top view when the adapter of another embodiment of the present disclosure is a protruding structure.
Figure 18:
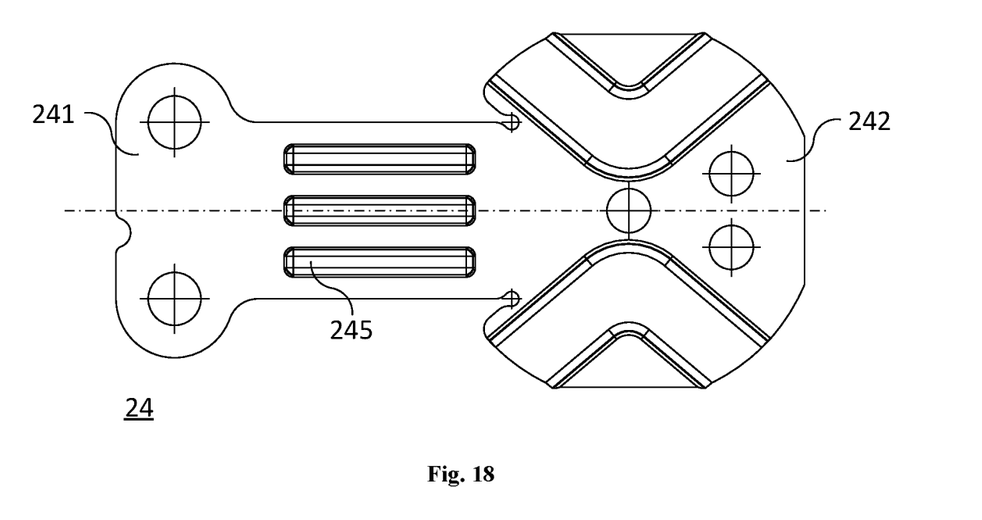
FIG. 18 is a top view when the adapter of further another embodiment of the present disclosure is a protruding structure.

FIG. 16 is a top view when the adapter 24 of an embodiment of the present disclosure is a protruding structure; FIG. 17 is a top view when the adapter 24 of another embodiment of the present disclosure is a protruding structure; FIG. 18 is a top view when the adapter 24 of further another embodiment of the present disclosure is a protruding structure.

As shown in FIGS. 16 to 18, the reinforcing portion 245 includes a protruding structure disposed on at least one side surface of the third connecting portion 243 along the thickness direction of the third connecting portion 243. The reinforcing portion 245 is in the form of a protrusion to limit the position of the bending crease of the bending portion 244. The bending portion 244 and the third connecting portion 243 are integral structure, and have a coplanar surface along the thickness direction. Since the protruding structure is convex relative to the surface of the third connecting portion 243 along the thickness direction, when the bending portion 244 is bent, the bending crease will extend along the edge of the protruding structure and form a continuous straight line with a determined position, ensuring that after the bending portion 244 is bent, the first connecting portion 241, the second connecting portion 242 and the third connecting portion 243 are mutually parallel and close to each other.

In an embodiment of the present disclosure, the protruding structure includes a plurality of protruding portions. The protruding portions are arranged in a direction parallel to the bending axis.

Illustratively, the protruding portions may contain one or more of the following three forms:

(1) As shown in FIG. 16, the protruding portions are two groups, each group is provided with a plurality of protrusions, and each group of protrusions is arranged along the side where the third connecting portion 243 is connected with the bending portion 244;

(2) As shown in FIG. 17, the protruding portions are two, each protruding portion is long strip shape, and each protruding portion extends along the side where the third connecting portion 243 is connected with the bending portion 244;

(3) As shown in FIG. 18, the protruding portions are two, each protruding portion is long strip shape, and each protruding portion extends from the side of the third connecting portion 243 close to the first connecting portion 241 to the side of the third connecting portion 243 close to the second connecting portion 242.

In an embodiment of the present disclosure, the thickness of the protruding structure is less than or equal to the bending radius of the bending portion 244. Once the thickness of the protruding structure is greater than the bending radius of the bending portion 244, the first connecting portion 241 or the second connecting portion 242 will be upwarped relative to the third connecting portion 243, that is, the bending angle of the bending portion 244 is less than 180°, which may increase the distance between the tab 21 and the electrode terminal 23, thereby increasing the axial dimension of the battery cell 20. The thickness of the protruding structure in the embodiment of the present disclosure is less than or equal to the bending radius of the bending portion 244, so that after the bending portion 244 is bent, the first connecting portion 241, the third connecting portion 243 and the second connecting portion 242 form a three-layer layered structure, the first connecting portion 241 or the second connecting portion 242 is prevented from being upwarped, so that the battery cell 20 has a smaller axial dimension.

In an embodiment of the present disclosure, the reinforcing portion 245 includes an insulating layer covering at least a part of at least one side surface of the third connecting portion 243 along the thickness direction of the third connecting portion 243. By disposing the insulating layer on the third connecting portion 243, it is more difficult to bend at the position where the insulating layer is disposed on the third connecting portion 243 than the bending portion 244, so that the position of the bending axis of the bending portion 244 is limited.

Figure 19:
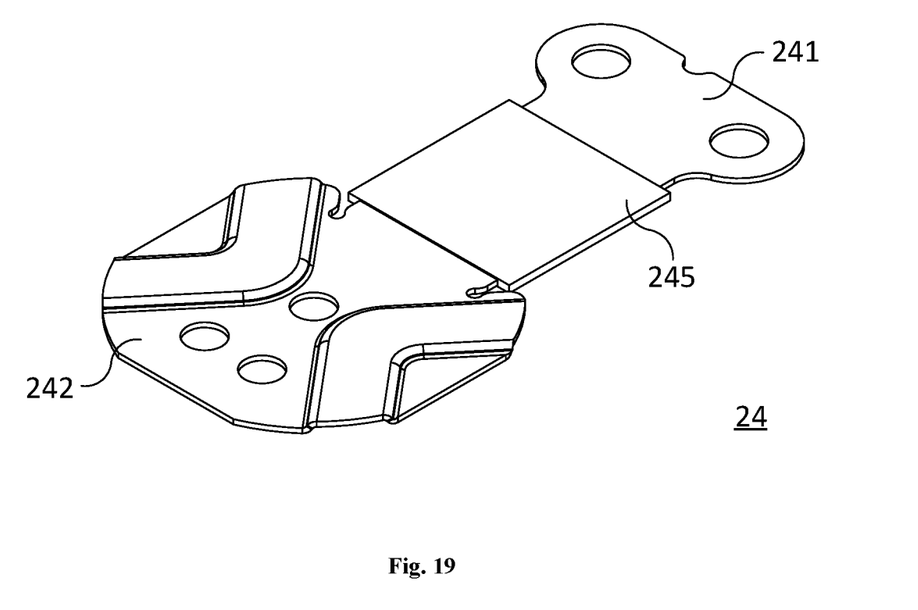
FIG. 19 is a top view when the adapter of an embodiment of the present disclosure is an insulating layer.
Figure 20:
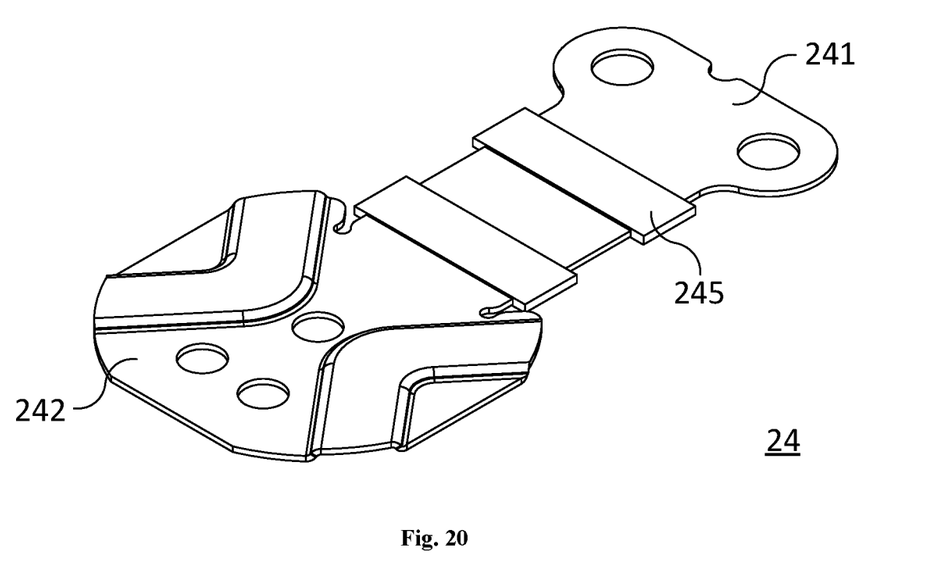
FIG. 20 is a top view when the adapter of an embodiment of the present disclosure is an insulating layer.

FIG. 19 is a top view when the adapter 24 according to an embodiment of the present disclosure is an insulating layer; FIG. 20 is a top view when the adapter 24 according to an embodiment of the present disclosure is an insulating layer.

As shown in FIG. 19 and FIG. 20, the insulating layer covers two side surfaces of the third connecting portion 243 in the thickness direction. Considering that the adaptor 24 can electrically connect the tab 21 with the electrode terminal 23, after the adaptor 24 is bent, in order to avoid electrical connection between the side surfaces of the first connecting portion 241, the second connecting portion 242 and the third connecting portion 243 in the thickness direction, which affects the normal use of the battery cells 20, in the present disclosure, the two sides of the third connecting portion 243 in the thickness direction being covered with an insulating layer can not only limit the position of the bending axis of the bending portion 244, but also realize insulation between the side surfaces of the first connecting portion 241, the second connecting portion 242 and the third connecting portion in the thickness direction.

In an embodiment of the present disclosure, the thickness of the insulating layer is less than or equal to the bending radius of the bending portion 244. Once the thickness of the insulating layer is greater than the bending radius of the bending portion 244, the first connecting portion 241 or the second connecting portion 242 will be upwarped relative to the third connecting portion 243, that is, the bending angle of the bending portion 244 will be less than 180°, which may increase the distance between the tab 21 and the electrode terminal 23 and thereby increases the axial dimension of the battery cell 20. The thickness of the insulating layer in the embodiment of the present disclosure is less than or equal to the bending radius of the bending portion 244, so that after the bending portion 244 is bent, the first connecting portion 241, the third connecting portion 243 and the second connecting portion 242 form a three-layer layered structure, the first connecting portion 241 or the second connecting portion 242 is prevented from being upwarped, so that the battery cell 20 has a smaller axial dimension.

It should be noted that, in the two electrodes of a battery cell 20, each electrode is provided with a corresponding tab 21, a corresponding adapter 24 and a corresponding electrode terminal 23, and the adapter 24 of each electrode can use any of the above-mentioned embodiments to realize the limitation of the position of the bending axis of the bending portion 244. For example, the reinforcing portion 245 of the adapter 24 of the positive electrode and the reinforcing portion 245 of the adapter 24 of the negative electrode are all convex structure forms; the reinforcing portion 245 of the adapter 24 of the positive electrode is in the form of a convex structure, the reinforcing portion 245 of the adapter 24 of the negative electrode is in the form of an insulating layer; the reinforcing portion 245 of the adapter 24 of the positive electrode is in the form of an insulating layer, the reinforcing portion 245 of the adapter 24 of the negative electrode is in the form of a convex structure; the reinforcing portion 245 of the adapter 24 of the positive electrode and the reinforcing portion 245 of the adapter 24 of the negative electrode are both in the form of insulating layers.

In view of the above, the battery cell 20, the battery and the electricity consuming devices provided by the above-mentioned embodiments of the present disclosure are provided with a reinforcing portion 245 on the third connecting portion 243 to limit the position of the bending axis of the bending portion 244, so that the bending axis can be bent at a predetermined position, the bending crease of the bending portion 244 is prevented from being offset, so that the electrode terminal 23 can be smoothly installed in the shell 22 of the battery cell 20, reducing the possibility of damage to the adapter 24 due to the offset of the crease and increasing the service life of the adapter 24.

The present disclosure may be embodied in other specific forms without departing from its spirit and essential characteristics. For example, the algorithms described in particular embodiments may be modified without departing from the basic spirit of the present disclosure. Accordingly, the present embodiments are to be considered in all respects as illustrative and not restrictive, the scope of the present disclosure being defined by the appended claims rather than the foregoing description, and all changes falling within the scope of the meaning and equivalents of the claims are thus included in the scope of the present disclosure.

What is claimed is:

1. A battery cell comprising:
   a tab;
   an electrode terminal; and
   an adapter for electrical connection between the electrode terminal and the tab, wherein the adapter comprises a first connecting portion for electrical connection with the electrode terminal; a second connecting portion for electrical connection with the tab; a third connecting portion for connecting the first connecting portion and the second connecting portion; and a first bending portion and a second bending portion, wherein the third connecting portion is connected to the first connecting portion by the first bending portion and the third connecting portion is connected to the second connecting portion by the second bending portion; and,
   wherein the third connecting portion comprises a reinforcing portion, the reinforcing portion being located at two sides where the third connecting portion is connected with the first and the second bending portions; and
   a minimum distance L between an edge of the reinforcing portion and a center line of the first bending portion satisfies:

$R < L < (R+2 \text{ mm})$, wherein L is the minimum distance between the edge of the reinforcing portion and the center line of the first bending portion, and R is a bending radius of the first bending portion.

2. The battery cell according to claim 1, wherein the reinforcing portion extends from a side of the third connecting portion close to the first connecting portion to a side of the third connecting portion close to the second connecting portion.

3. The battery cell according to claim 1, wherein a number of the reinforcing portion is at least two, the at least two reinforcing portions being respectively located on a side of the third connecting portion close to the first connecting portion and a side of the third connecting portion close to the second connecting portion.

4. The battery cell according to claim 1, wherein the reinforcing portion comprises:
   a protruding structure disposed on at least one side surface of the third connecting portion along a thickness direction of the third connecting portion.

5. The battery cell according to claim 4, wherein the protruding structure comprises a plurality of protruding portions arranged in a direction parallel to a center line of the third connecting portion.

6. The battery cell according to claim 4, wherein a thickness of the protruding structure is less than or equal to the bending radius of the first bending portion.

7. The battery cell according to claim 1, wherein the reinforcing portion comprises:
   an insulating layer covering at least a part of at least one side surface of the third connecting portion along a thickness direction of the third connecting portion.

8. The battery cell according to claim 7, wherein the insulating layer covers two side surfaces of the third connecting portion along the thickness direction.

9. The battery cell according to claim 7, wherein a thickness of the insulating layer is less than or equal to the bending radius of the first bending portion.

10. A battery comprising the battery cell according to claim 1.

11. An electricity consuming device comprising the battery cell according to claim 1, the battery cell being configured to provide electrical energy.

* * * * *